Feb. 13, 1968 R. C. GLIDDEN 3,369,079

AUTOMATIC TELEPHONE ALARM REPORTING SYSTEM
RESPONSIVE TO CHANGES IN VOLTAGE ACROSS
SUBSCRIBER'S TELEPHONE LINES

Filed Feb. 4, 1965 3 Sheets-Sheet 1

Roger C. Glidden
INVENTOR.
BY Clarence A. O'Brien and Harvey B. Jacobson
Attorneys Roger C. Glidden
INVENTOR.
BY Clarence A. O'Brien
and Harvey B. Jacobson
Attorneys Roger C. Glidden
INVENTOR.

BY Clarence A. O'Brien
and Harvey B. Jacobson
Attorneys

United States Patent Office 3,369,079

Patented Feb. 13, 1968

3,369,079

AUTOMATIC TELEPHONE ALARM REPORTING SYSTEM RESPONSIVE TO CHANGES IN VOLTAGE ACROSS SUBSCRIBER'S TELEPHONE LINES

Roger C. Glidden, Wenham, Mass., assignor to The Glidden Electric Corporation, a corporation of Massachusetts Continuation-in-part of application Ser. No. 158,374, Dec. 11, 1961. This application Feb. 4, 1965, Ser. No. 430,431

12 Claims. (Cl. 179—5)

ABSTRACT OF THE DISCLOSURE

An automatic dialing and message transmitting device connected to the telephone lines at a subscriber's station through which a sensor may switch the lines from the telephone instrument to the automatic device in order to report to an automatically dialed receiving station. Cylic operation of the automatic device is triggered by the sensor and stops or recycles upon completion of an operational cycle which is controlled by changes in the voltage across the telephone lines at the subscriber's station depending on whether or not the report is received at the receiving station.

This invention relates to automatic reporting systems particularly useful in connection with telephone communication lines and involves improvements over the system disclosed and claimed in my prior copending application U.S. Ser. No. 158,374, filed Dec. 11, 1961, now abandoned, with respect to which the present application is a continuation-in-part.

The present invention is concerned with a condition reporting ssytem that may be utilized in connection with leased telephone lines or the like whereby information may be dispatched to selected receiving stations through the telephone lines. Thus, the system of the present invention may be useful as a fire or burglar alarm, for meter reading purposes, remote radiation detecting purposes as well as for operation and response to selective actuation for organized message transmission purposes.

A unique feature of the present invention, is the utilization of an automatic dialing mechanism adapted for reporting systems of different types which operates under control of changes in the voltage levels that appear across the telephone lines at subscriber's station to which the system is connected.

One important object of the present invention, therefore, is to provide a condition sensing system associated with message transmission lines such as commercial telephone lines, in order to sense and report conditions at a reporting station to one or more selected receiving stations.

Another object of the present invention is to provide a telephone reporting system through which meter readings may be reported to a receiving station at which the information may be utilized to bill customers of the particular utility involved, such as power utilities.

A still further object of the present invention is to provide an automatic dialing mechanism capable of being adapted to different systems associated with signal message lines, the dialing mechanism being operative to program the dispatch of information to selected receiving stations under control of changes in the voltage level across the signal message lines and without interference with the operation of the usual telephone instruments to which the message signal lines are connected.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
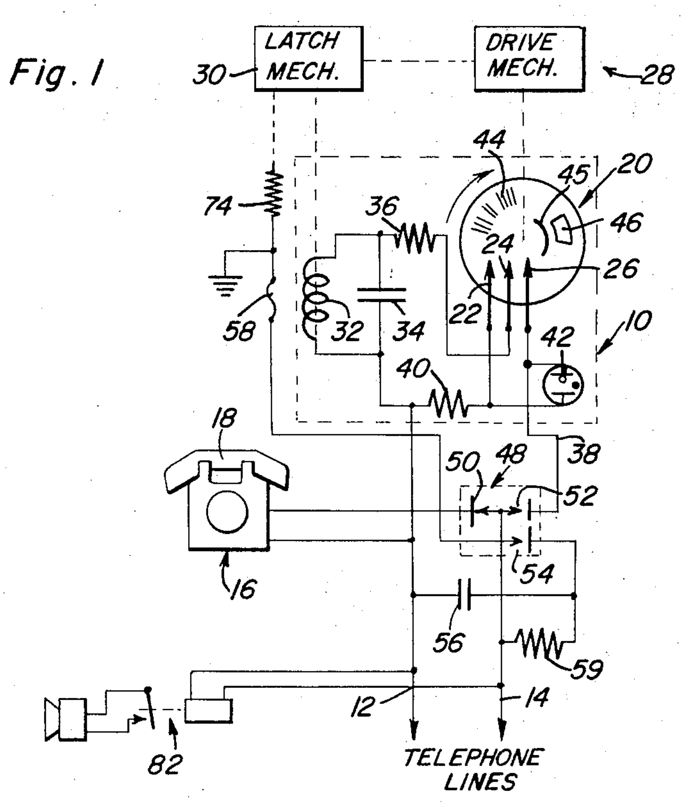
FIGURE 1 is a schematic circuit diagram of the automatic dialing mechanism of the present invention in one particular reporting system installation.

Referring initially to FIGURE 1, it will be observed that the dialing mechanism generally referred to by reference numeral 10, is associated with a condition reporting system involving commercial telephone lines 12 and 14, for example, adapted to be connected to the usual telephone instrument 16 at a reporting station. It will be appreciated, that the telephone lines 12 and 14 are part of a commercial telephone system to which a plurality of receiving stations are connected whereby messages may be transmitted through the telephone lines to and from the telephone instrument 16 at the reporting station. It will be further appreciated by those skilled in the art, that when the equipment at the reporting station is inactive, the telephone lines 12 and 14 connected to the telephone instrument 16 will maintain a relatively high voltage thereacross of approximately 48 v. DC so that when the telephone hand set 18 is removed from the instrument base, the closing of the circuit and the volt drop produced across the telephone lines at the subscriber's station will be sensed by the flow of current through a line relay to seize the automatic equipment at the central station in order to return a signal when the terminal voltage across the telephone lines is reduced to a relatively low value such as 4 v. DC, this condition being recognized as a dial tone by the user of the telephone instrument at which time any selected receiving station may be dialed therethrough. When the telephone lines are connected by the automatic switching equipment at the central office to the receiving station dialed from the reporting station, the voltage level across the telephone lines is increased once again to the member 26 relatively high value so that messages may be transmitted between the reporting and receiving stations should a party at the receiving station respond. If the telephone instrument is already in use at the receiving station dialed, a busy signal is detected at the reporting station characterized by a reduction to the relatively low voltage across the telephone lines. Programming of the dialing mechanism 10 is accordingly controlled by the foregoing changes in the voltage level across the telephone lines and the particular voltage level situation at any particular time.

The dialer mechanism 10 includes a coded programming disc member 20 or any suitable equivalent thereof in operative contact with a plurality of fixed contact members such as the dialing contact member 22, the coil contact member 24 and the line contact member 26. In one particular form of the invention, the programming disc member 20 may be made of conductive material in wiping contact with the contact members and having non-conductive portions produced by a chemical etching process. It will be apparent that other programming arrangements could be used including edge notches on a disc for camming switches between open and closed positions as described in the aforementioned copending application or photo-conductive pulsing means. The programming disc member 20 is therefore adapted to be continuously rotated at the proper rotational speed by a suitable source of motive power such as the diagrammatically illustrated drive mechanism 28. The operative periods of the drive mechanism 28 may be programmed under control of a latch mechanism 30 which in turn is under control of a voltage sensing solenoid coil 32 associated with the dialing mechanism. Accordingly, when the coil 32 is energized, it will be operative through the latch mechanism 30 to stop operation of the drive mechanism 28 in order to stop movement of the programming disc member 20. The coil 32 may be energized only when the relatively higher voltage appears across the telephone lines 12 and 14 at the reporting station as will be explained hereafter. Connected across the opposite terminals of the voltage sensing coil 32, is a capacitor 34 arranged to prevent chatter of the solenoid associated with the coil 32. A current limiting resistor 36 connects one terminal of the coil 32 to the contact member 24 while the other terminal of the coil is connected directly to the telephone line 12. Accordingly, the voltage sensing coil may be electrically connected across the telephone lines in series with the current limiting resistor 36 when electrical contact is established between the contact member 24 and the line contact member 26 adapted to be connected to the telephone line 14 through the conductor 38. Also, a load resistor 40 is adapted to be connected across the telephone lines when an electrical connection is established between the contact member 22 and the line contact member 26. A voltage limiting neon lamp 42 may also be connected across the contact members 22 and 26 so as to reduce the amount of sparking between the contact members as electrical contact therebetween is established and broken.

The programming disc member 20 as hereinbefore indicated is made of conductive material so as to establish electrical connections between the fixed contact members. The electrical connection between the dialing contact member 22 and the line contact member 26 is therefore intermittently broken by the non-conductive dialing strips 44 mounted on the disc member for engagement with the dialing contact member 22 as the programming disc member is rotated. The intermittent interruption in the circuit established across the telephone lines through the load resistor 40, thereby produces dialing pulses as is well known in the art. Following the dialing period in response to clockwise rotation of the programming disc as viewed in FIGURE 1, continuous contact is re-established between the contact members for message transmission. Accordingly, the programming disc may be provided with additional non-conductive strips whereby coded signals may be dispatched through the telephone lines to a receiving station. Following the message period, the coil contact member 24 and the dialing contact member 22 respectively engage non-conductive strips 45 and 46 during a hang-up period. At the beginning of the hang-up period the voltage sensing coil 32 in series with the current limiting resistor 36 is initially disconnected from the telephone lines when the contact member 24 engages non-conductive strip 45 followed by disconnection of the load resistor 40 when the dialing contact member 22 engages the non-conductive strip 46. Accordingly, during the hang-up period, both energization of the coil 32 is prevented and the telephone circuit is opened. Immediately following the hang-up period, electrical contact is re-established between the contact members so that if a relatively higher voltage appears across the telephone lines at that time as will be hereafter explained, the coil 32 will be energized to stop operation of the drive mechanism 28 through the latch mechanism 30 at the start position of the programming disc between the hang-up period and the dialing period. On the other hand, if the voltage appearing across the telephone lines following the hang-up period, is of the relatively low value aforementioned, then the dialing mechanism recycles since the coil 32 will not be effective to stop rotation of the programming disc at its start position.

In order that the dialing mechanism may operate as aforementioned, the telephone instrument 16 must be disconnected from the telephone lines at the same time that the conductor 38 connects the contact member 26 to the telephone line 14. Switching of the telephone lines from the telephone instrument 16 to the dialing mechanism 10 is effected by the condition sensing switch assembly 48 which may be of the thermal type for example where the system is to be used for fire reporting purposes. It will of course be appreciated that other condition sensing switch assemblies may be utilized as hereinbefore indicated. The condition sensing switch assembly therefore includes normally closed switch contacts 50 establishing an electrical connection between the telephone instrument 16 and the telephone line 14 and a normally opened switch contact section 52 through which the telephone line 14 is electrically connected to the conductor 38 upon actuation of the switch assembly. A second normally opened switch contact section 54 may be associated with the switch assembly 48 so that an electrical discharge path may be established between the storage capacitor 56 and the fuse element 58 which holds the latch mechanism 30 latched through spring 74. While the switch section 54 is opened, prior to actuation of the switch assembly 48, the capacitor 56 may be charged to capacity through the charging resistor 59 connected in series with the capacitor across the telephone lines. Thus, when the switch assembly 48 is actuated, the fuse element 58 will be melted by supply current therethrough from the capacitor 56 releasing the latch mechanism 30 from its set position preventing operation of the drive mechanism 28. Control of the latch mechanism is thereby transferred to the voltage sensing coil 32. The foregoing arrangement is therefore suitable for resetting by replacement of the fuse 58 or by automatic means as hereafter described. The dialer could, however, be modified by replacing the voltage sensing relay coil 32 with a voltage sensing fuse element which will respond to the open line voltage upon actuation of the condition sensing switch assembly 48 to release the latch mechanism 30. In such case the dialer will recycle until the switch assembly 48 is opened.

Figure 2:
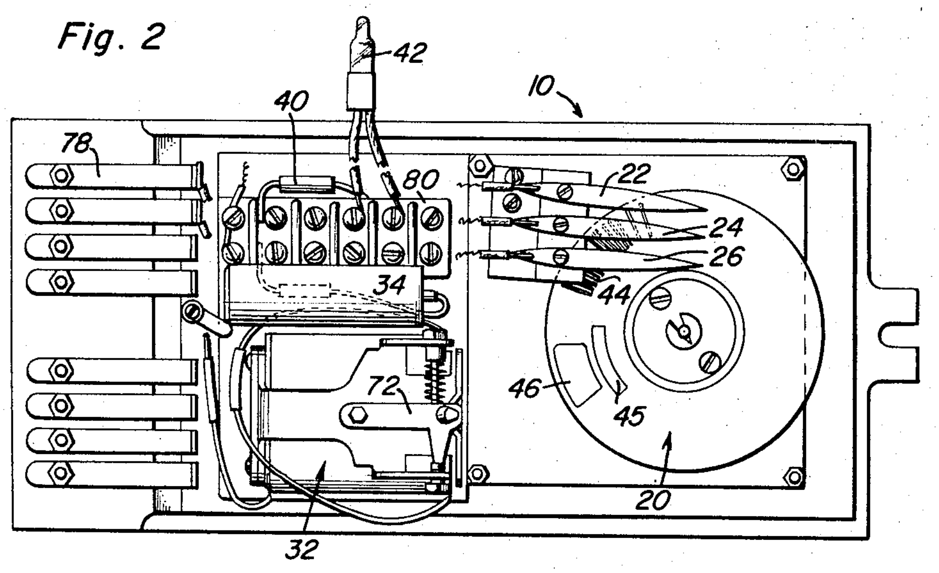
FIGURE 2 is a top plan view of the dialing mechanism.
Figures 3, 4:
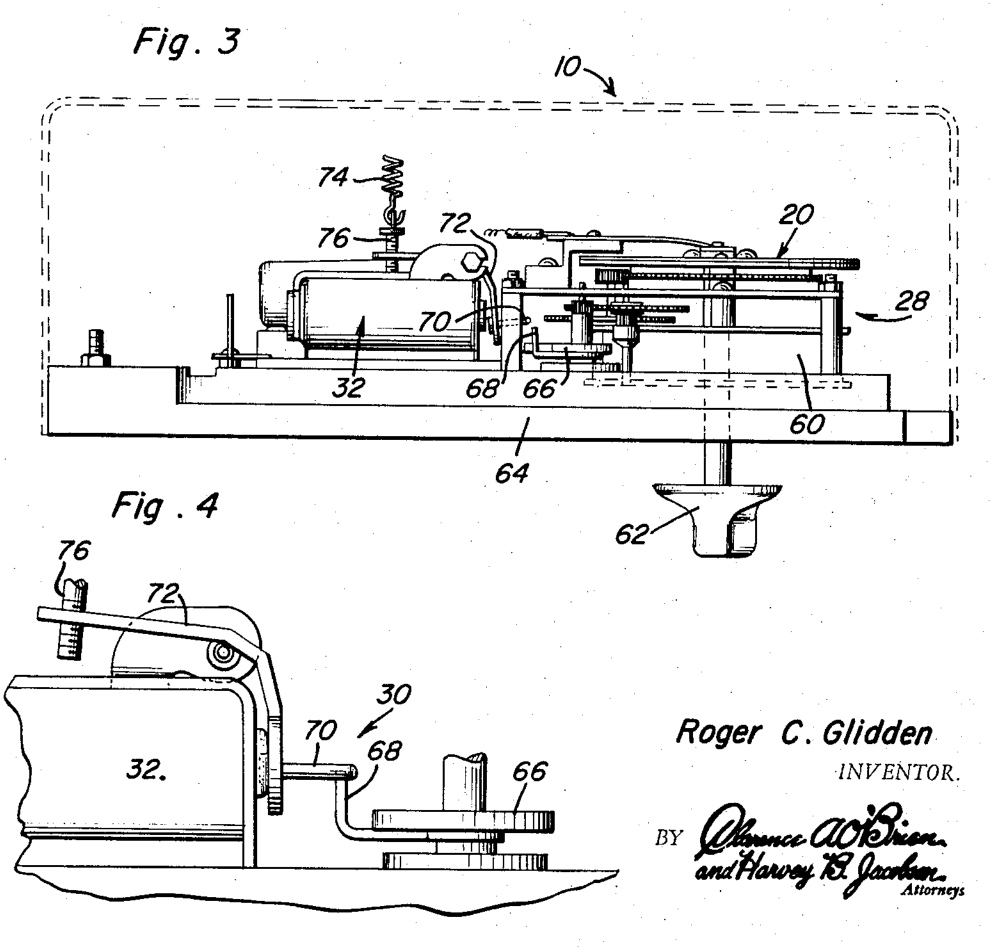
FIGURE 3 is a side elevational view of the dialing mechanism shown in FIGURE 2.
FIGURE 4 is an enlarged partial side elevational view of a portion of the dialing mechanism in another operative condition thereof.

Referring now to FIGURES 2 through 4, one particular form of dialing mechanism is illustrated. The drive mechanism 28 for the programming disc member 20 may therefore be in the form of a spring-wound clock mechanism having associated therewith a spring motor device 60 adapted to be wound by the wind up knob 62 projecting from one side of the non-conductive base 64 on which the dialing mechanism is mounted. Associated with the clock mechanism is a motion regulating fly wheel member 66 through which the latch mechanism 30 is operative to stop operation of the clock drive mechanism. Accordingly, a latch element 68 is connected to the fly wheel member 66 and projects radially therefrom so that when the stop element 70 is displaced into its path of movement, it will be operative to stop rotation of the programming disc member 20 at its starting position with the contact members 22, 24, and 26 disposed between the dialing strips 44 and the non-conductive strips 45 and 46. The stop element 70 is displaced into the path of movement of the latch element 68 by pivotal displacement of the solenoid armature member 72 to which the stop element is connected as more clearly shown in FIGURES 3 and 4. It will therefore be appreciated that energization of the solenoid coils 32 will be effective to stop movement of the programming disc at its start position. The armature 72 is, however, initially held in the position shown in FIGURE 4 under the bias exerted thereon by the spring 74 connected by the screw element 76 to the armature member. The spring 74 may therefore be suitably anchored by the fuse element 58 aforementioned in connection with FIGURE 1, so that when the condition sensing switch assembly 48 is actuated, the armature will be released and as long as the solenoid coil 32 is de-energized, the armature will assume the position illustrated in FIGURE 3 raising the stop element 70 out of the path of the latch element 68. Operation of the dialing mechanism will then be initiated. The switch assembly 48 may therefore be electrically connected to the dialing mechanism as diagrammatically illustrated in FIGURE 1 through the terminal elements 78 through which the telephone lines may also be connected to the dialing mechanism. Electrical connections may also be established through the terminal bar 80 between the various components of the dialing mechanism including the voltage sensing solenoid coils 32, the capacitor 34, the load resistor 40, the neon lamp 42 and the contact members 22, 24 and 26.

From the foregoing description, the construction, and operation of the dialing mechanism and the reporting system with which it is associated, will be apparent. Summarizing the operation of the system, it will be recalled that in response to the sensing of some condition such as fire by the switch assemby 48, actuation thereof will disconnect the telephone instrument 16 from the telephone lines while at the same time connect the lines to the dialer mechanism through the switch contact section 52. At the same time, closing of the switch section 54 will release the latch mechanism 30 so that control thereof will be transferred to the voltage sensing coil 32. Since the contact members 22, 24 and 26 in the start position of the programming disc 20 are in electrical contact with each other, both the voltage sensing coil 32 and the load resistor 40 will be connected across the telephone lines. If the telephone instrument 16 were not in use at the time that the condition sensing switch 48 was actuated, a volt drop is produced by connection of the load resistor 40 across the telephone lines. Accordingly, the voltage sensing coil 32 will not be energized and the drive mechanism 28 released in order to initiate rotation of the programming disc member 20. The non-conductive dialing strips 44 will then intermittently interrupt the circuit to produce the dialing pulses. In this fashion, a particular receiving station such as the subscriber to the reporting system will be dialed. After the dialing period, the programming disc may be provided with facilities for dispatch of a message as aforementioned. Following the message period, the circuit is opened during the hang-up period by means of the non-conductive strips 45 and 46 as aforementioned constituting the circuit interrupting means associated with the dialing mechanism. Accordingly, if the party at the receiving station had not responded, the relatively higher voltage across the telephone lines will not be maintained following the hang-up period because on closing of the contacts after the hang-up period, the lines are again loaded by resistor 40 so that the corresponding reduction in the voltage across the telephone lines will prevent energization of coil 32 and cause recycling of the dialing mechanism. On the other hand, if the party at the receiving station had received the message, operation of the dialing mechanism may be stopped from the receiving station by dialing the reporting station during the hang-up period or following the message period in which case, there will be no reduction in the higher voltage across the telephone lines or dial tone following the hang-up period. This occurs because the resistor 40 and then the coil 32 in series with resistor 36 is connected across the lines. This loading of the lines at the reporting station establishes a connection from the receiving station to the reporting station resulting in a relatively high voltage across the lines at the reporting station in the commercial telephone system servicing the region where the applicant resides. The coil 32 will therefore be energized in order to stop operation of the drive mechanism immediately following the hang-up period. It will therefore be appreciated, that stoppage or recycling of the dialing mechanism 10 may be controlled by a party at the receiving station. Further, operation of the dialing mechanism after the condition sensing switch 48 has been actuated may be resumed at any time when the party at the receiving station hangs up as long as the condition sensing switch assembly 48 remains actuated. Accordingly, parties at the receiving stations may interrogate the reporting system in order to check whether or not it is in operation.

Various modifications and adaptations of the dialing mechanism may be utilized dependent upon the requirements of the reporting system. As described in connection with FIGURES 1 through 4, a spring wound clock mechanism was utilized as the source of power, this being particularly desirable in connection with a seldom used fire reporting alarm system since it relies on its own source of motive energy for the programming disc member. This type of fire reporting system would of course require resetting after operation. It will, of course, be apparent, that automatic resetting facilities such as hereafter described in connection with FIGURE 5 could be provided if desired and that the dialing mechanism need not be interconnected with any telephone instrument where it is to be located at some unattended location. Further, other motive sources of energy could be utilized to drive the programming disc member including for example an electric motor with operational control facilities under control of the voltage sensing coil 32 described in connection with FIGURE 1 or an electro-mechanical motor which is operative to automatically rewind a spring device each time it is unwound. Also, an alerting relay 82 could be connected across the telephone lines 12 and 14 as shown in FIGURE 1, so that if the lines were dead for any reason, an alarm would be produced at the reporting station to indicate that no reporting operation is possible.

Figure 6:
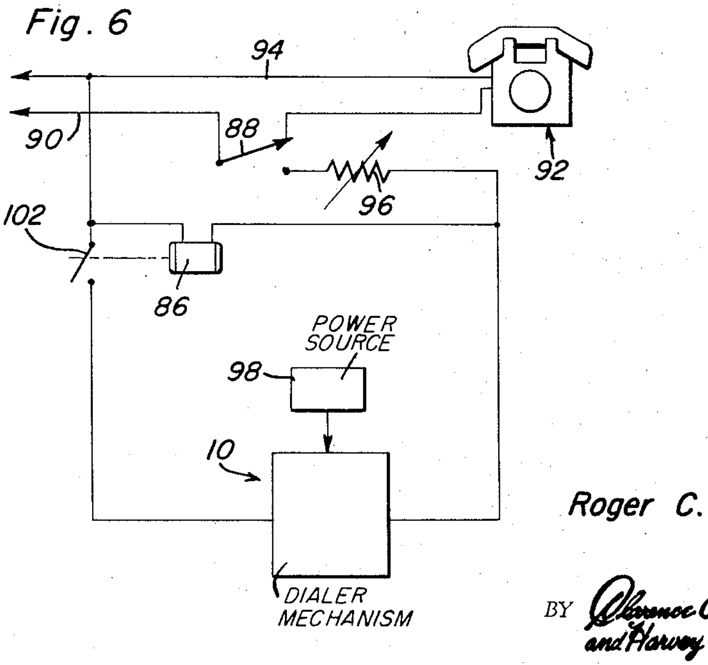
FIGURE 6 is a schematic circuit diagram showing a modified form of dialer mechanism in a fire reporting system.

FIGURE 6 illustrates one modified form of fire reporting system in which a dialer mechanism 10 as hereinbefore described is driven by any suitable source 98 and is arranged to interrupt communication to report an emergency condition such as fire. A thermal sensing switch 88 therefore normally interconnects telephone line 90 with the telephone instrument 92 while the other telephone line 94 is connected both to the telephone instrument and to one terminal of a relay 86. The other terminal of the relay is connected by the adjustable resistor 96 to the telephone line 90 for adjusting the dialer load to that of the telephone line load. Thus, in response to the sensing of fire, actuation of the switch 88 will connect the relay coil 86 across the telephone lines in order to cause energization thereof. Upon energization of the coil 86, operation of the dialer 10 is initiated by closing of relay switch 102 connecting the dialer 10 across the lines in series with resistor 96. Dialing operation will follow however only when a dial tone is returned because it coincides with a low voltage condition across the telephone lines. The foregoing modified system requires however that the central office of the telephone system have facilities for producing the dial tone after a delay period if the lines are opened at either the reporting or receiving station. When the temperature returns to normal, the switch 88 may return to its normal position causing de-energization of the relay coil 86 and restoring the telephone instrument 92 to operation.

Figure 5:
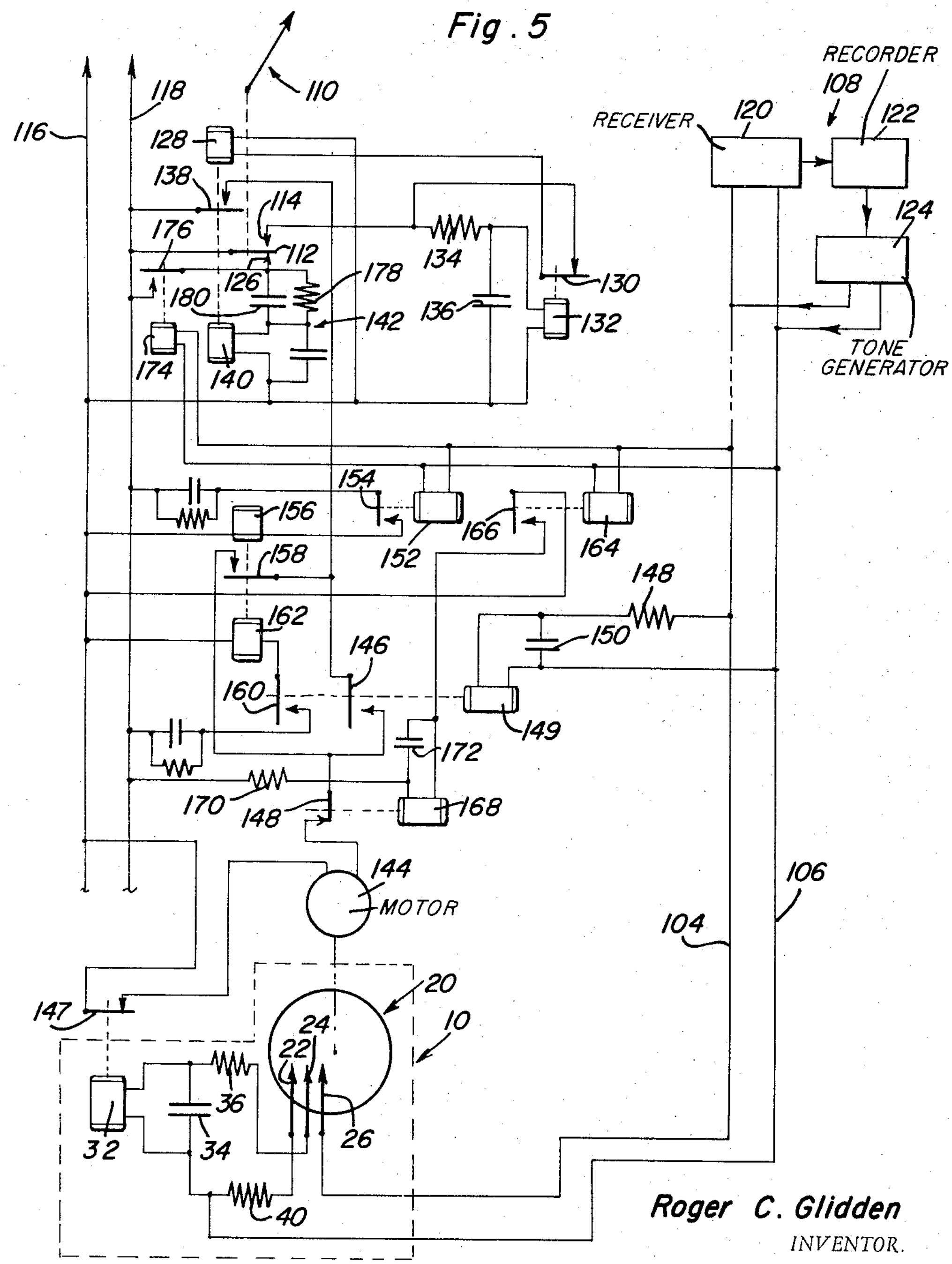
FIGURE 5 is an electrical circuit diagram showing the dialing mechanism associated with a meter reading system.

The dialing mechanism of the present invention is particularly useful in connection with the meter reading system such as depicted in FIGURE 5. In this particular system, the dialing mechanism 10 may be connected by the telephone lines 104 and 106 to a receiving station 108 located for example at the office of an electric power company having an unlisted telephone number. Accordingly, every time a fixed increment of electrical energy is consumed at the reporting station as indicated by the usual indicating meter dial 110 diagrammatically illustrated in FIGURE 5, a microswitch 112 is actuated so as to momentarily engage the contact 114, the meter 110 recording the consumption of electrical energy supplied to the reporting station by the power lines 116 and 118, for example. The motion of the meter pointer 110 when reaching a particular position indicating the consumption of an increment of electrical energy, will momentarily actuate the microswitch 112 producing a pulse that initiates operation of the dialing mechanism 10. The dialing mechanism will accordingly automatically dial the unlisted number of the receiving station 108 as hereinbefore described. If after dialing the receiving station, a busy signal is produced, the dialing mechanism recycles until the lines at the receiving station are opened so as to receive the information from the reporting station which is in operation. The dialing mechanism 10 will accordingly dispatch coded signals during its message period which will identify its location as well as to signal consumption of an incremental amount of electrical energy. The information will accordingly be recorded by a receiver 120 at the receiving station and recorded by the recorder 122 for billing purposes. After the information is so recorded, operation of a tone generator 124 is initiated so as to dispatch a signal along the telephone lines indicating that the information has been received and operative to reset the mechanism at the reporting station in order to await consumption of the next increment of electrical energy.

When the meter pointer 110 momentarily actuates the microswitch 112 displacing it from contact with the contact 126 into engagement with the contact 114, the latching relay coil 128 is energized by an energizing circuit established through the normally closed relay switch 130 in series with the contact 114. At the same time, an energizing circuit is established for the relay coil 132, energization of which is delayed by the R-C network including the resistor 134 and capacitor 136. Accordingly, the relay switch 138 is closed by energization of the latching relay coil 128 and remains closed until subsequent energization of the unlatching relay coil 140 when the microswitch 112 returns to its position engaging the contact 126. Energization of the unlatching relay coil 140 is, however, also delayed by the network 142 so that the relay switch 138 remains in its closed position for a sufficient length of time. Also, after the relay switch 138 has been closed, energization of the relay coil 132 opens the relay switch 130 so as to prevent re-energization of the latching coil 128 until another increment of electrical energy has been consumed.

Upon closing of the relay switch 138, an electrical connection is established from the power line 118 to the motor 144 through the normally opened relay switch 146 and the normally closed relay switch 148 in series with the relay switch 138. The motor 144 is also connected through the normally closed relay switch 147 to the power line 116 so that an energizing circuit will be completed upon closing of the relay switch 138 and the normally opened relay switch 146. The relay switch 146 is however maintained closed by energization of the relay coil 149 connected across the telephone lines 104 and 106 sensing the relatively high voltage level in the telephone lines. Accordingly, energization of the motor 144 initiates operation of the dialer mechanism 10. The load placed on the telephone lines by operation of the dialer mechanism produces a reduction in voltage across the lines at the reporting station to the relatively low value of approximately 4 volts. However, de-energization of the relay coil 14 is delayed because of the R-C network including the resistor 148 and capacitor 150 thereby maintaining the motor circuit closed for the delay period. During this delay period, if the dial tone signal is sensed by the tuned relay coil 152, the relay contacts 154 are closed to effect energization of the latching relay coil 156. Thus, the relay switch 158 associated with the latching relay coil 156, is closed before opening of the relay switch 146 upon de-energization of the relay coil 149 in order to maintain the motor 144 energized. On the other hand, if the dial tone signal is not sensed by the relay coil 152, then the motor stops until the dial tone is received. When the dialing mechanism approaches the end of a cycle and opens the telephone circuit during the hang-up period aforementioned, so that the relatively higher voltage is thereafter restored to the telephone lines, the relay coil 149 is re-energized in order to close the relay switch 160 associated therewith, thereby energizing the unlatching relay coil 162. The latching relay switch 158 is then opened in order to reset the circuit for receiving the dial tone signal as aforementioned.

If a busy signal is received at any time, it is sensed by the tuned relay coil 164 closing the relay switch 166 to thereby complete an energizing circuit for the relay coil 168. Upon energization of the relay coil 168, the normally closed relay switch 148 is open in order to interrupt the energizing circuit for the dialer motor 144. Operation of the dialing mechanism is thereby stopped until the busy signal is removed. Also associated with the relay coil 168, is a resistor 170 and a capacitor 172 operative to delay de-energization thereof so that the relay switch 148 will not close until about 2 seconds following the last busy signal pulse. Thus, chattering of the switch contacts by the busy signal pulses is avoided.

When the information is received at the receiving station 108 as aforementioned, the output of the tone generator 124 is sensed by the tuned relay coil 174 connected to the telephone lines so as to close the relay switch 176 associated therewith. An energizing circuit is thereby established through the unlatching coil 140 in order to open the latching relay switch 138 which cannot be relatched in its closed position until another increment of energy has been consumed for reasons hereinbefore indicated. The network 142 therefore includes the resistor 178 operative to slowly discharge the capacitor 180 so that the unlatching coil 140 can be re-energized if another increment of power should be consumed and another operational cycle will ensue within a few minutes of the preceding cycle.

From the foregoing description of the meter reading system it will be apparent that the power lines 116 and 118 are isolated from the telephone lines, thus meeting a requirement of telephone companies that no power from an outside source be fed into their lines. It will also be recalled, that each time an incremental amount of power is consumed at any reporting station, the dialing mechanism at the reporting station will dial an unlisted number corresponding to a receiving station at the power utility office at which no telephone instrument is located. The ringing current produced as a result of the dialing of the number at the receiving station, may operate the equipment located at the receiving station so as to record pulses identifying the reporting station. The information so recorded on tape for example could be utilized in an accounting machine for billing the customer. After recording of the reported consumption of electrical energy, operation of the tone generator 124 ensues so as to signal the reporting station that the information has been received. Operation of the system in no way adversely effects operation of the telephone system or its equipment at the telephone central station and provides an accurate and economical method for measuring the consumption of electrical energy and for billing customers.

It will therefore be apparent that the dialing mechanism of the present invention will be useful in different types of reporting systems because of its operational attributes and operational relationship to the voltage changing conditions aforementioned. Further, operation of the dialing mechanism and any system with which it is associated or for which it is adapted, will in no way adversely effect operation of the telephone system to which it is applied.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a condition sensing device at a reporting station to which telephone lines are connected, an automatic reporting mechanism comprising, means actuated by the sensing device for loading the telephone lines at the reporting station, power operated dialing means for producing dialing signals when connected to the telephone lines, switching means for connecting the dialing means to the telephone lines simultaneously with said loading thereof, and voltage sensing means responsive to changes in the voltage across said telephone lines at the reporting station following said loading thereof for controlling operation of the dialing means to program the reporting mechanism.

2. The combination of claim 1 wherein said dialing means includes an independently powered drive mechanism, a coded member driven by the drive mechanism and contacts engageable with the coded member and connected to the line loading means, the switching means and the voltage sensing means.

3. The combination of claim 2 wherein said voltage sensing means includes latch means engageable with the drive mechanism for holding the same stationary and solenoid coil means connected to the contacts for releasing the latch means in response to a reduction in the voltage level following said loading of the telephone lines.

4. The combination of claim 1 including latch means operatively engageable with said dialing means for stopping movement thereof at a starting position, and circuit interrupting means driven by the dialing means for temporarily disconnecting the signal lines from the reporting station.

5. The combination of claim 4 wherein said latch means comprises, a motion regulator member driven by the dialing means, a stop element displaceable to a latching position into the path of movement of said regulator member, and means operatively connected to the condition sensing switch means for initially holding the stop element in said latching position.

6. The combination of claim 5 wherein said voltage sensing means comprises, a solenoid coil, means connecting said coil to the dialing means and the telephone lines for energization of the coil, armature means displaceable in response to energization of said coil and means connecting said armature means to the stop element for displacement thereof to the latching position.

7. The combination of claim 6 wherein said dialing means comprises, a conductive disc member, means connected to the disc member for continuous rotation thereof upon release of the latch means, dialing load means, dialing contact means engageable with the disc member for connecting said load means across the telephone lines, and coil contact means engageable with said disc member for connecting the coil across the telephone lines in parallel with the load means.

8. The combination of claim 7 wherein said circuit interrupting means comprises, non-conductive portions on the disc member engageable by said contact means in response to rotation of the disc member for electrically disconnecting the load means and the coil from the telephone lines during a hang-up period.

9. The combination of claim 4 wherein said voltage sensing means comprises, a solenoid coil, means connecting said coil to the dialing means and the telephone lines for energization of the coil, armature means displaceable in response to energization of said coil and means connecting said armature means to the latch means for displacement thereof to a position stopping movement of the dialing means.

10. The combination of claim 9 wherein said dialing means comprises, a conductive disc member, means connected to the disc member for continuous rotation thereof upon release of the latch means, dialing load means, dialing contact means engageable with the disc member for connecting said load means across the telephone lines, and coil contact means engageable with said disc member for connecting the coil across the telephone lines in parallel with the load means.

11. The combination of claim 10 wherein said circuit interrupting means comprises, non-conductive portions on the disc member engageable by said contact means in response to rotation of the disc member for electrically disconnecting the load means and the coil from the telephone lines during a hang-up period.

12. The combination of claim 4 including a spring wound clock motor connected to said dialing means for continuous rotation thereof upon release of the latch means.

References Cited

UNITED STATES PATENTS

| | | | |
|---|---|---|---|
| 3,026,383 | 3/1962 | Englander | 179—1 |
| 3,098,123 | 7/1963 | Stonor | 179—2 |
| 3,109,894 | 11/1963 | Humphreys | 179—5 |
| 3,206,551 | 9/1965 | Crowson et al. | 179—5 |

JOHN W. CALDWELL, *Primary Examiner.*

DAVID G. REDINBAUGH, *Examiner.*

J. T. STRATMAN, *Assistant Examiner.*